(12) United States Patent
Cheal et al.

(10) Patent No.: US 8,174,146 B2
(45) Date of Patent: May 8, 2012

(54) POWER SPLIT TAILGATE SYSTEM AND METHOD

(75) Inventors: Jonathon Paul Anthony Cheal, Staffordshire (GB); Andrew Warbruton, Warwickshire (GB); Bharat Jina, West Midlands (GB)

(73) Assignee: Land Rover, Warwick (GB)

( * ) Notice: Subject to any disclaimer, the term of this patent is extended or adjusted under 35 U.S.C. 154(b) by 64 days.

(21) Appl. No.: 12/425,049

(22) Filed: Apr. 16, 2009

(65) Prior Publication Data

US 2010/0264688 A1 Oct. 21, 2010

(51) Int. Cl.
*B60J 5/00* (2006.01)

(52) U.S. Cl. ............... 307/9.1; 307/10.1; 296/146.4; 296/146.8

(58) Field of Classification Search ............ 307/9.1, 307/10.1; 296/51, 56, 57.1, 146.4, 146.8
See application file for complete search history.

(56) References Cited

U.S. PATENT DOCUMENTS

| 2,893,727 A | * | 7/1959 | Barnard | 296/56 |
| 4,717,196 A | | 1/1988 | Adams | |
| 5,417,469 A | | 5/1995 | Hammond | |
| 6,007,139 A | | 12/1999 | Shave | |
| 6,315,346 B1 | | 11/2001 | Martin | |
| 6,471,284 B2 | | 10/2002 | Landmesser | |
| 6,814,383 B2 | | 11/2004 | Reed, III et al. | |
| 6,891,344 B2 | | 5/2005 | Sakai et al. | |
| 7,034,485 B2 | * | 4/2006 | Kuan et al. | 296/146.4 |
| 7,086,689 B2 | | 8/2006 | Dean | |
| 7,156,447 B2 | | 1/2007 | Watanabe | |
| 7,172,322 B2 | | 2/2007 | Pommeret et al. | |
| 7,393,043 B2 | | 7/2008 | Kargilis et al. | |
| 2004/0113456 A1 | | 6/2004 | Greuel et al. | |
| 2006/0152029 A1 | | 7/2006 | Tomasson et al. | |
| 2007/0262603 A1 | | 11/2007 | Robertson | |

FOREIGN PATENT DOCUMENTS

| EP | 0745516 A1 | | 12/1996 |
| EP | 1428709 A2 | | 6/2004 |
| EP | 1539556 B1 | | 9/2006 |
| GB | 2290060 A | * | 12/1995 |
| WO | 9842527 A1 | | 10/1998 |
| WO | 2005080726 A1 | | 9/2005 |

* cited by examiner

*Primary Examiner* — Fritz M Fleming
(74) *Attorney, Agent, or Firm* — Brooks Kushman P.C.

(57) ABSTRACT

A power, split tailgate system is provided that allows each of an upper and a lower tailgate door to be simultaneously or independently driven between open and closed positions. The tailgate system may be operated in a chauffer mode where the lower tailgate door is opened to allow for the storage of luggage and other materials and in a manner that limits exposure of the passenger compartment.

4 Claims, 7 Drawing Sheets

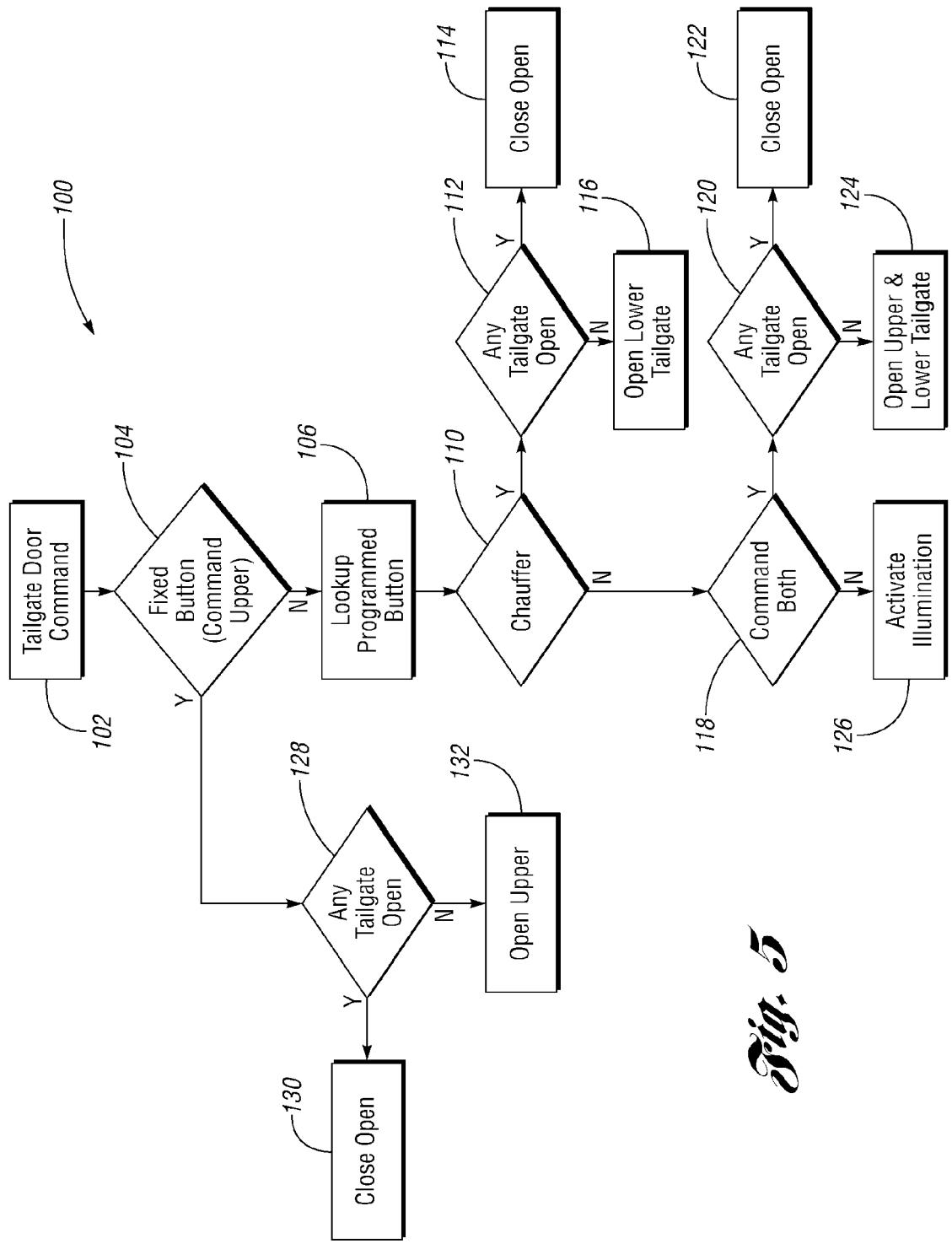

POWER SPLIT TAILGATE SYSTEM AND METHOD

BACKGROUND OF THE INVENTION

1. Field of the Invention

The present invention relates to a power split tailgate system and method of controlling the same.

2. Background Art

A five door vehicle, such as but not limited to a station wagon, sport utility vehicle (SUV), cross-over vehicle (XUV), van, etc., may include a tailgate at a rear of the vehicle. The tailgate gate may include one or more doors that open to provide access to a passenger compartment. When opening the tailgate, the passenger compartment may be exposed to the outside elements in a manner that can cause discomfort to the vehicle occupants, especially those sitting in the rear.

Exposing occupants to the outside conditions may be unfavorable, especially when the vehicle is used in hot or cold climate countries or ones that suffer from poor air quality. This situation may be considered to be especially unacceptable in a chauffer market sector where occupants are paying a chauffer to drive them to a particular destination. If the tailgate needs to be opened, such as to place into or remove items from the vehicle luggage space, occupants may be exposed to the elements, effecting the conditioned air environment inside the cabin.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 5 illustrates a flowchart of a method of controlling the split tailgate system wherein open tailgate doors are returned to a closed position in accordance with one non-limiting aspect of the present invention;

DETAILED DESCRIPTION OF THE PREFERRED EMBODIMENT(S)

Figure 1:
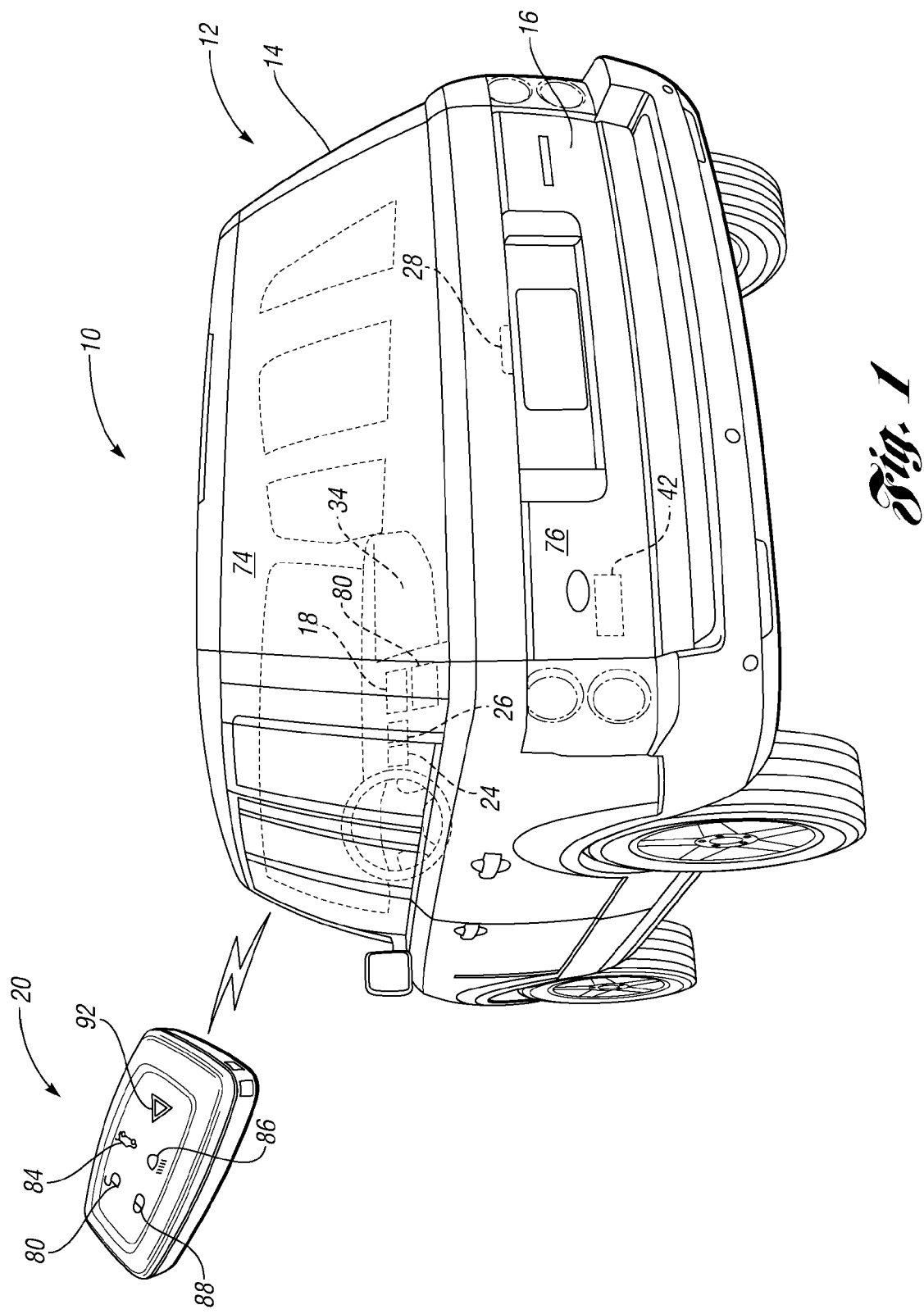
FIG. 1 illustrates a split tailgate system in accordance with one non-limiting aspect of the present invention.

FIG. 1 illustrates a vehicle 10 having a split tailgate system 12 in accordance with one non-limiting aspect of the present invention. The split tailgate system 12 may be an electrically driven system configured to articulate an upper tailgate door 14 and a lower tailgate door 16 between open and closed positions. FIGS. 2-4b illustrate the automatic movement of one or both of the upper and lower tailgate doors 14, 16 between closed and open positions. As shown, the upper tailgate door 14 may be opened without opening the lower tailgate door 16 (see FIG. 2), both of the upper and lower tailgate doors 14, 16 may be opened at the same time (see FIG. 3), and the lower tailgate door 16 may be opened without opening the upper tailgate door 14 (see FIGS. 4a-4b).

A controller 18 may be included within the vehicle 10 to control tailgate door opening and closing. The controller may be configured to independently control movements of the upper and lower tailgate doors 14, 16. This may include an upper mode control sequence shown in FIG. 2 where the upper door 14 is actuated to the open position while the lower door 16 remains closed. Another door control sequence may be a dual mode shown in FIG. 3 where both of the upper and lower doors 14, 16 are simultaneously articulating. Depending on the shape of the doors 14, 16, this may include articulating the upper door 14 slightly ahead of the lower door 16. Yet another door control sequence may be a chauffer mode shown in FIGS. 4a-4b where the lower door 16 is actuated while the upper door 14 remains closed.

Wireless messages from a remote control 20, such as but not limited to a fob, may be used to instruct the controller 18 to instigate tailgate door control. Wireline messages from buttons 24, 26, 28, 30, 32 included within a dashboard 34 or a rear of the vehicle 10 may similarly be used to instruct the controller to open and close one or both of the tailgate doors 14, 16. The controller 18 may control operations of an upper electric motor 40 and a lower electric motor 42 in order to respectively control upper and lower tailgate door 14, 16 positioning. While the motors 40, 42 may be positioned anywhere within the vehicle 10, they are shown for exemplary purposes to be disposed within a drain channel 46 around an outer perimeter of the upper tailgate door 14 and within a enclosure of the lower tailgate door 16 that may or may not be watertight.

Because the motors 40, 42 can be controlled to independently articulate the tailgate doors 14, 16, the present invention is able to sequence tailgate door 14, 16 movement in any suitable manner. One of the door control sequences may include limiting occupant exposure to the environment by automatically opening only the lower tailgate door 16. In the past, it was extremely difficult for a user to only open the lower tailgate door 16 since the user was required to partially open the upper tailgate door 14 first. By automatically sequencing movement of the upper and lower tailgate doors 14, 16, the controller 18 is able to automatically open the lower tailgate door 16 in an easier manner and without overly exposing the passenger compartment.

Figure 3:
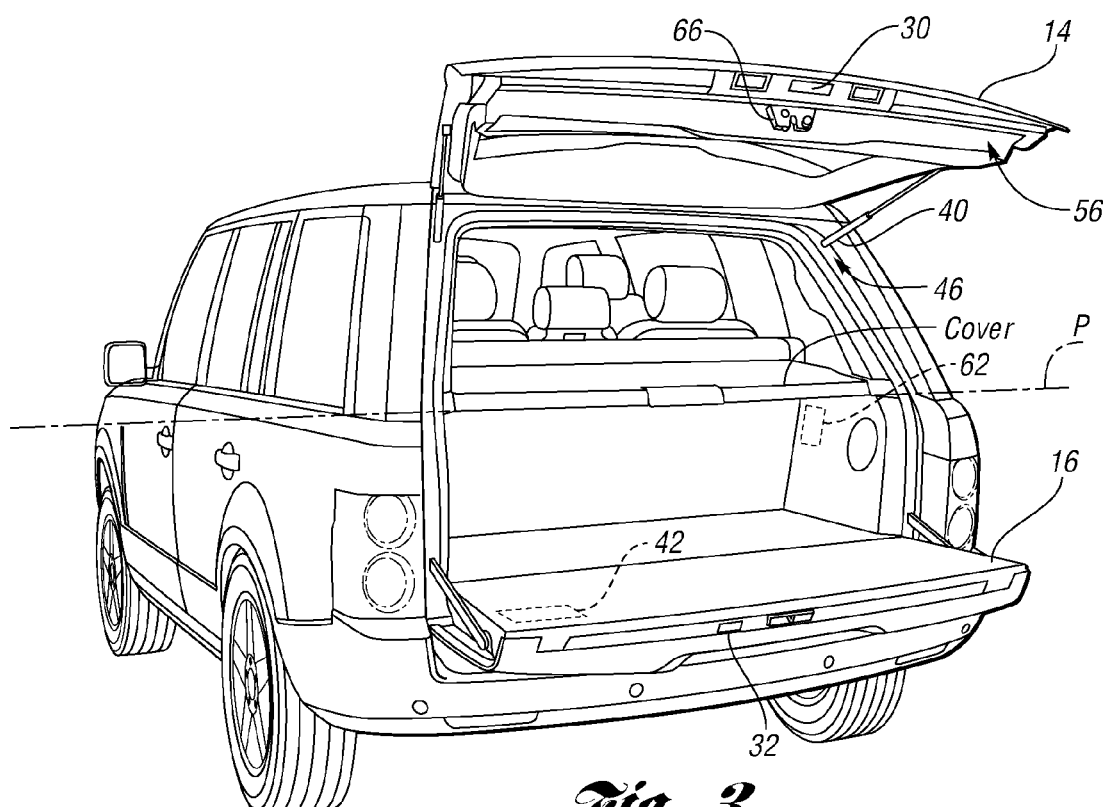
FIG. 3 illustrates articulation of both of an upper and lower tailgate door to an open position in accordance with the present invention.

As shown in more detail in FIG. 3, a compartment cover 50 may be included with a storage area 52 to extend rearwardly from a rear seat 54 to the tailgate doors 14, 16. The compartment cover 50 may be positioned above a bottom 56 of the upper tailgate door 14 when closed and below a top 58 of the rear seat 54 in order to separate the storage area 52 into upper and lower storage portions. The coverage of the compartment cover 50 may be adjusted manually by pushing or pulling a leading edge 60, or optionally, with related control of a compartment cover motor 62. When executing door control sequences according to the chauffer mode, the upper tailgate door 14 may maintain a position below a horizontal plane P defined by the compartment cover 50 while the lower tailgate door 16 is being opened in order to limit exposure of the upper storage area and the rest of the passenger compartment to the outside elements.

Figure 2:
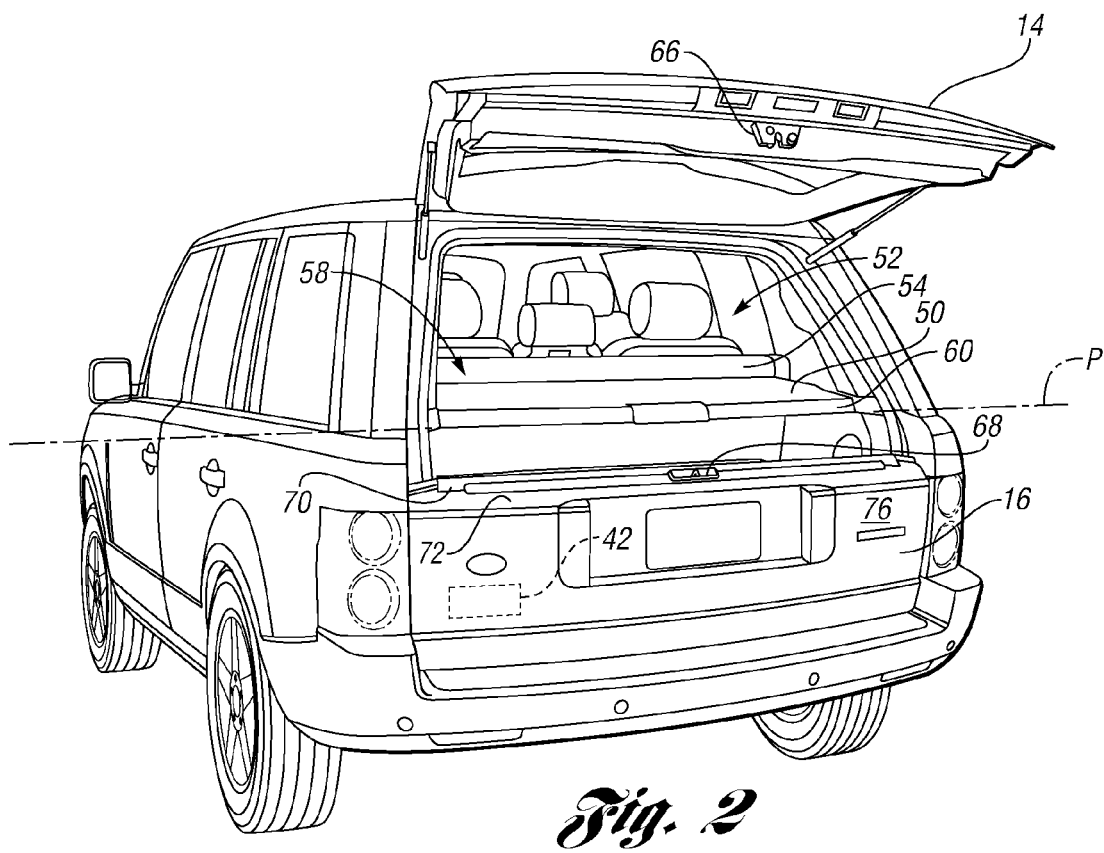
FIG. 2 illustrates articulation of an upper tailgate door to an open position in accordance with the present invention.
Figure 4A:
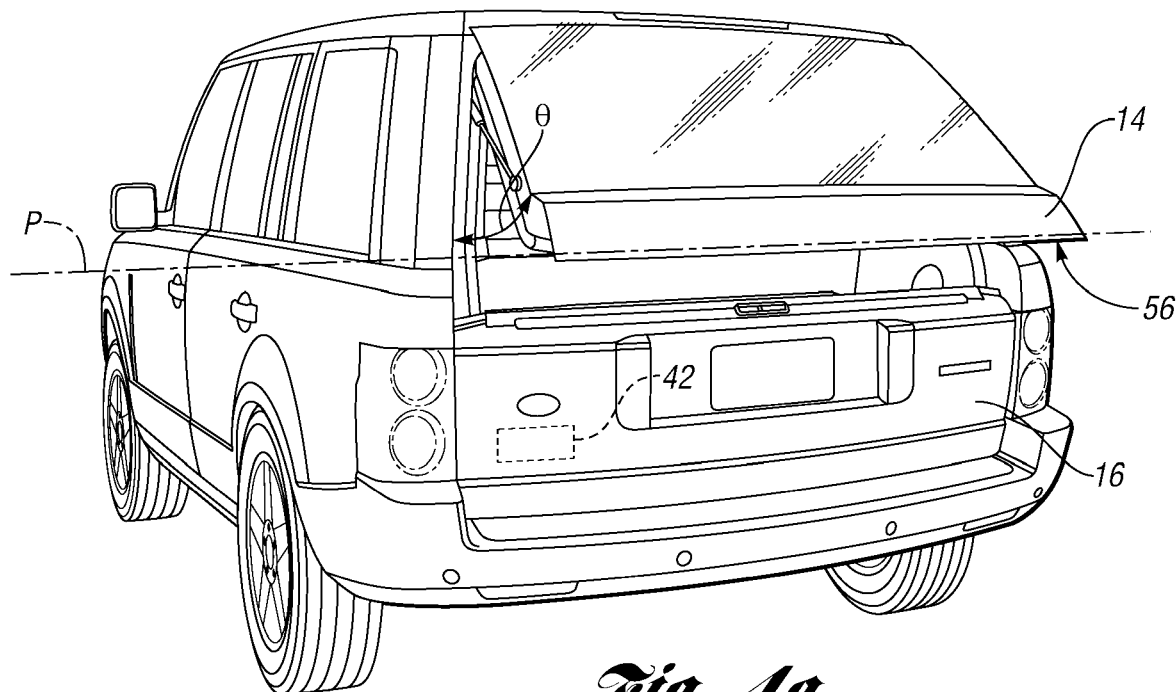
FIGS. 4a-4b illustrate articulation of a lower tailgate door to an open position in accordance with the present invention.
Figure 4B:
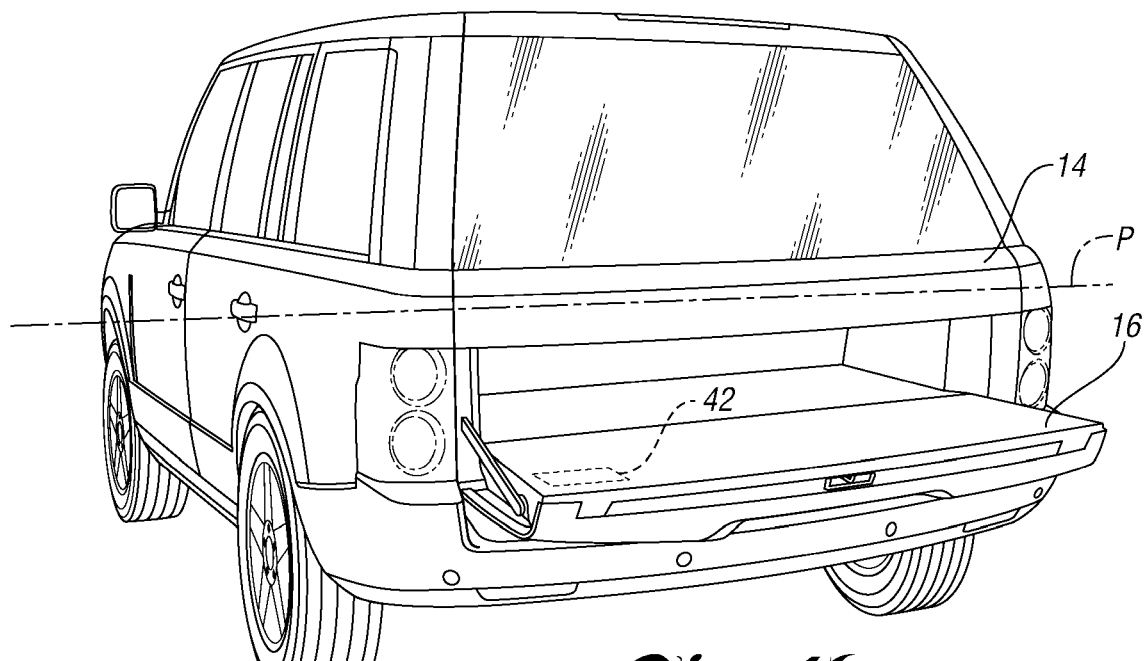

FIGS. 4a and 4b illustrate a sequence of door movements that may be coordinated by the controller 18 when opening the lower tailgate door 16 according to the chauffer mode sequence of door controls. As shown in FIG. 2, the bottom portion 56 of the upper tailgate door 14 includes a lock 66 that mates with a latch 68 included on a lip 70 of the lower tailgate door 16. A ledge 72 is positioned below the latch 68 to cover the bottom 56 of the upper tailgate door 14 so that an exterior portion 74 of the upper door 14 is flush with an exterior portion 76 of the lower door 16 when both are closed (see FIG. 1). To open the lower tailgate door 16, the upper tailgate door 14 may be partially opened, at least until the lip 70 is able to articulate past the bottom 56 of the upper tailgate door 14 (see FIG. 4a), and then the lower tailgate door 16 may be articulated to its open position (see FIG. 4b). Depending on the size and shape of the upper and lower tailgate doors 14, 16, an angle of articulation θ of the upper door may be as much as 25° or 25% of the total angle θ. Optionally, once the lower tailgate door 16 is clear of the upper tailgate door 14, the upper tailgate door 14 may be automatically articulated back to its closed position or it may remain in the partially open position.

As noted above, the door controls contemplated by the present invention to manage articulation of the upper and lower tailgate doors 14, 16 may be instigated upon receipt of a message sent from the fob 20 or buttons 24, 26, 28, 30, 32 included on the vehicle 10. One of the vehicle buttons 28 may be included on the outside portion 76 of the upper tailgate 14 to control opening and closing of the upper tailgate door 14. Another vehicle button 30 having the same functionality of the button 28 may be included on the bottom side 56 of the upper tailgate door 14 to provide easy button access when the upper tailgate door 14 is open. Another button 32 to control open and closing of the lower tailgate door 16 may be included on the ledge 72 such that it is concealed from view when the upper door 14 is closed, which may be helpful in providing a more uniform rearward appearance for the vehicle 10 than including the button on the exterior portion 74 of the lower tailgate door 16.

With reference to FIG. 1, one of the buttons 24 may be an upper door button included on the dashboard 34 that instructs the controller 18 to open or close the upper tailgate door 14. This button 24 may be 'fixed' in that is preprogrammed to control the upper tailgate door 14 at the time of manufacturing. Another button 26 included in the dashboard 34 may be a "programmable" button in that it can be programmed by a vehicle occupant to selectively execute an available door control. For example, a programming selection menu having a number of available door control sequences may be displayed within a display or other human machine interface (HMI) 80 such that user selection of one of the door control sequences controls whether the button 26 controls both doors 14, 16 (dual mode), only the lower door 16 (chauffer mode), or some other operation, such as but not limited to vehicle illumination, e.g., the interior/exterior of the vehicle 10, including the doors 14, 16, may be illuminated. The illumination mode may be "fixed" in vehicles having a single tailgate door or split tailgate doors where the lower tailgate door 16 is not powered.

Buttons 84, 86 included on the fob 20 may mimic the functionality provided by the buttons 24, 26 included within the dashboard 34. The fob 20 may include the same "fixed" assignment of an upper door button 84 and the same "programmable" assignment of a programmable button 86. The fob 20 may also include buttons 88, 90, 92 to instruct the controller 18 to execute the vehicle controls, such as but not limited to a door unlock button 90, door lock button 88, and panic button 92, which are commonly employed with remote keyless entry (RKE) related systems. The fob 20 may also perform other operations, such as but not limited to passive entry (PE), including passively supporting tailgate door control sequences. Depression of the fob buttons 84, 86, 88, 90, 92 may instruct the fob 20 to issue a specific message depending on the depressed button. Optionally, the message transmitted from the programmable key 86 may be the same regardless of the operation to be controlled by the controller 18 in response to receipt of the message.

If multiple fobs 20 are authorized to control the vehicle 10, each fob 20 may be configured to issue the same message upon actuation of the same fob button 84, 86, 88, 90, 92. In this manner, the controller 18 need not interpret the messages differently depending on the fob 20 transmitting the message or throughout changes in programming of the programmable button 86. Optionally, while the messages transmitted may be the same for each fob 20, identifiers of the fob 20 transmitting the message may be included. If user specific control is desired, the controller 18 can use the identifiers to lookup an associated user in order to execute user specific operations. In this manner, a first user can program the controller 18 to execute a different tailgate door control sequence than a second user associated with another fob 20 even though both fobs 20 transmit the same message upon actuation of the programmable button 86.

FIG. 5 illustrates a flowchart 100 of a method of controlling the power, split tailgate system 12 in accordance with one non-limiting aspect of the present invention. The method may be executed with the assistance of the controller 18 executing operations for controlling upper and lower tailgate doors 14, 16 according to instructions included within a computer-readable medium. The method may be executed with respect to the system 12 described above or with respect to other systems having arrangements suitable to executing the operations contemplated by the present invention. For exemplary purposes, the method is described with respect to articulating upper and lower tailgate doors 14, 16 about a vehicle body. The present invention, however, is not intended to be limited to any particular direction of articulation or to articulating only upper and lower tailgate doors 14, 16.

Block 102 relates to determining a tailgate door command. The tailgate door command may relate to a command issued to open or close one or more of the upper and/or lower tailgate doors 14, 16. The command may be determined from user interaction with the remote control 20 or a suitable one of the vehicle buttons 24, 26, 28, 30, 32. Block 104 relates to assessing whether the command was triggered by one of the "fixed" buttons 24, 28, 30, 32, 84 or "programmable" buttons 26, 86. For exemplary purposes, the control sequence associated with a fixed button is assumed to be an upper command that indicates a desire to open or close the upper tailgate door 14. Optionally, the described programming may be limited to that completed by a vehicle owner after purchasing the vehicle, as opposed to at the time of manufacturing.

Block 106 is reached if the command is triggered by one of the programmable buttons. Block 106 includes reviewing a memory or other database accessible to the controller 18 to determine the control sequence associated with the actuated button. As noted above, user interaction with the HMI 80 may be used to assign a control sequence to the programmable button 26, 86. The assigned control sequence may be the same for the program button 86 on the fob 20 and the vehicle button 26, or the control sequence may be different for one or the other. In some cases, if different control sequences are assigned to the program button 86 of multiple fobs 20, Block 106 may include interrogating the related message in order to identify the transmitting fob.

Block 110 relates to determining whether the desired control sequence relates to a chauffer mode where only the lower tailgate door 16 is desired to be opened. If chauffer mode is determined in Block 110, an assessment as to whether either one of the upper or lower tailgate doors 14, 16 is currently in the open position is made in Block 112. If either door 14, 16 is open, any open tailgate door 14, 16 is automatically driven to its closed position in Block 114. The assumption to close any open door in response to button actuation is a selectable design parameter. Another assumption could be made to open the lower tailgate door 16 even if the upper tailgate door 14 is open. If neither one of the tailgate doors 14, 16 are open, the lower tailgate door 16 is opened in Block 116.

If the chauffer mode is not determined in Block 110, an assessment is made in Block 118 as to whether the desired control sequence relates to a dual mode where both of the upper and lower tailgate doors 14, 16 are to be simultaneously controlled. If dual mode is determined, an assessment is made in Block 120 as to whether either one of the upper or lower tailgate doors 14, 16 is currently in the open position. If either door 14, 16 is open, any open tailgate door 14, 16 is automatically driven to its closed position in Block 122, and if both doors 14, 16 are closed, both of an upper and lower tailgate doors 14, 16 are opened in Block 124.

Block 126 relates to executing another control when the programmable button has not yet been associated with controlling either one of the upper or lower tailgate doors 14, 16. For exemplary purposes, this other control is shown with respect to vehicle illumination where one or more of the interior or exterior vehicle lights are temporarily illuminated instead of articulating a tailgate door 14, 16. The present invention, however, is not intended to be so limited and fully contemplates executing any other type of control.

Returning to Block 104, if the desired door control is associated with one of the fixed buttons 24, 84, an assessment as to whether either one of the upper or lower tailgate doors 14, 16 is currently in an open position is made in Block 128. If either door is open 14, 16, any open tailgate door 14, 16 is automatically driven to its closed position in Block 130, and if both doors 14, 16 are closed, the upper tailgate door 14 is opened in Block 132. While the fixed button 24, 84 operations executed above are assigned at the time of manufacturing, the present invention fully contemplates reprogramming the fixed buttons 24, 84 in a manner similar to that used with respect to programming the programmable buttons 26, 86. In this way, the present invention may allow a user to assign door control sequences to each of the two door control buttons 84, 86 included on the fob 20 or each of the two door control buttons 24,26 provided on the dashboard 34.

Figure 6:
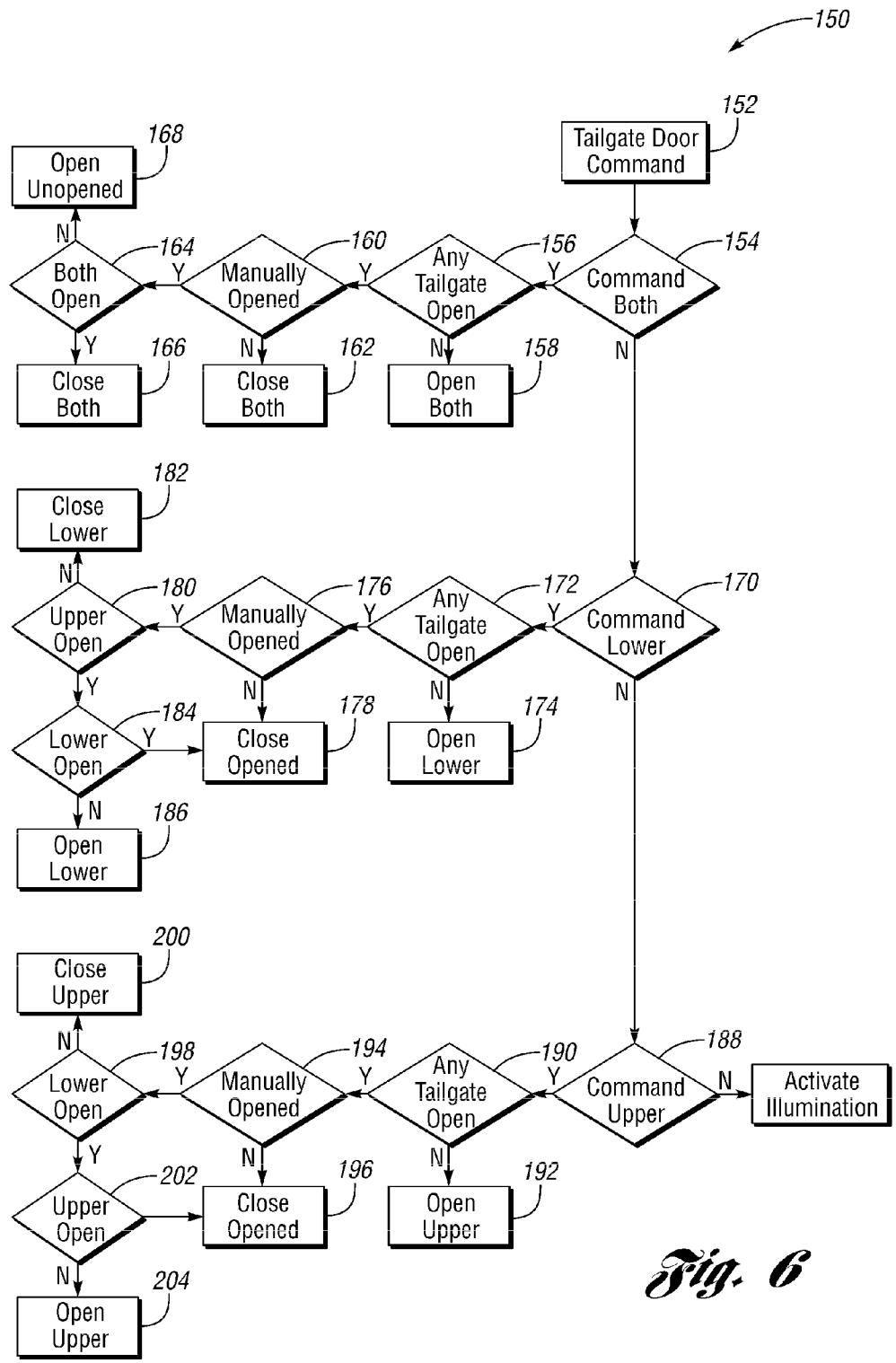
FIG. 6 illustrates a flowchart of a method of controlling the split tailgate system wherein tailgate door control sequences are determined according to whether any open doors were opened manually or electronically in accordance with one non-limiting aspect of the present invention.

FIG. 6 illustrates a flowchart 150 of a method of controlling a power, split tailgate 12 in accordance with one non-limiting aspect of the present invention. This method takes into consideration whether an open door was opened manually or electronically before deciding the door control sequence. Block 152 relates to determining a tailgate door command. While the method is described without regard to whether the tailgate door command relates to a programmable or fixed command, such an inquiry can optionally be included in a manner similar to that described above.

Block 154 relates to assessing whether any tailgate door 14, 16 is open if Block 156 determines the tailgate door command to be a control both doors command. If neither door 14, 16 is currently opened, both doors 14, 16 are opened automatically in Block 158. If at least one of the doors 14, 16 is open, Block 160 determines whether the open door 14, 16 was opened manually or electronically. If opened electronically, any open door 14, 16 is closed in Block 162, and if opened manually, an assessment as to whether the both doors 14, 16 were opened manually is made in Block 164. If both doors 14, 16 were opened manually, then both doors 14, 16 are closed in Block 166, and if one door 14, 16 was opened manually, then the unopened door 14, 16 is opened in Block 168.

Block 172 relates to assessing whether any tailgate door 14, 16 is open if Block 170 determines the tailgate door command to be a control lower command. If neither door 14, 16 is currently opened, the lower tailgate door 16 is opened automatically in Block 174. If at least one of the doors 14, 16 is open, Block 176 determines whether the open door 14, 16 was opened manually or electronically. If opened electronically, any open door 14, 16 is closed in Block 178, and if opened manually, an assessment as to whether the upper tailgate door 14 was opened manually is made in Block 180. If the upper tailgate door 14 was not opened manually, then only the lower tailgate door 16 must have been opened manually, resulting in the automatic closing of the lower door 16 in Block 182. If the upper tailgate door 14 was opened manually, then an assessment as to whether the lower tailgate door 16 was also opened manually is made in Block 184. If both doors 14, 16 were opened manually, then both doors 14, 16 are closed in Block 178, and if only the upper door 14 was opened manually, then the lower door 16 is opened in Block 186.

Block 190 relates to assessing whether any tailgate door 14, 16 is open if Block 188 determines the tailgate door command to be a control upper door command. If neither door 14, 16 is currently opened, the upper tailgate door 14 is opened automatically in Block 192. If at least one of the doors 14, 16 is open, Block 194 determines whether the open door 14, 16 was opened manually or electronically. If opened electronically, any open door 14, 16 is closed in Block 196, and if opened manually, an assessment as to whether the lower tailgate door 16 was opened manually is made in Block 198. If the lower tailgate door 16 was not opened manually, then only the upper tailgate door 14 must have been opened manually, resulting in the automatic closing of the upper door 14 in Block 200. If the lower tailgate door 16 was opened manually, then an assessment as to whether the upper tailgate door 14 was also opened manually is made in Block 202. If the both doors 14, 16 were opened manually, then both doors 14, 16 are closed in Block 196, and if only the lower door 16 was opened manually, then the upper door 14 is opened in Block 204.

The first flowchart 100 describes a control method where the tailgate door control commands are executed on the assumption that any open tailgate door 14, 16 should be closed upon receipt of a subsequent door command. The second flowchart 150 described a control method where open tailgated doors 14, 16 are not necessarily closed upon receipt of a subsequent door control command, i.e., the doors 14, 16 may remain open if the open door(s) 14, 16 were opened in a manual operation, such as if a user physically moved the doors 14, 16. The assumptions made in both methods are design parameters and not intended, unless otherwise noted, to limit the scope and contemplation of the present invention. Other assumptions may be made without deviating from the scope and contemplation of the present invention.

Figure 7:
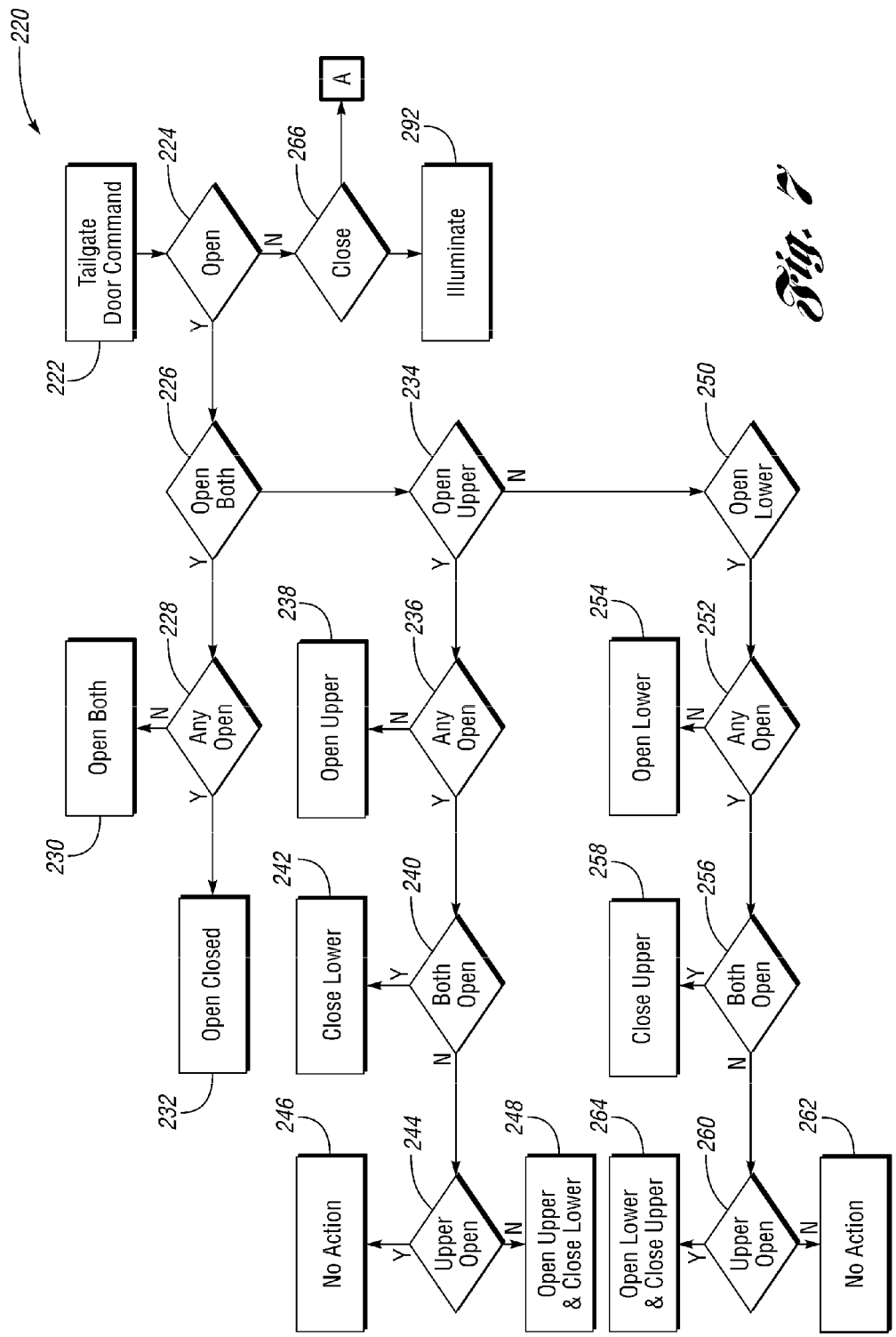
FIGS. 7 and 8 illustrate flowcharts of a method of controlling the tailgate system as a function of whether a tailgate door control command is intended to be an open command or a close command in accordance with one non-limiting aspect of the present invention.
Figure 8:
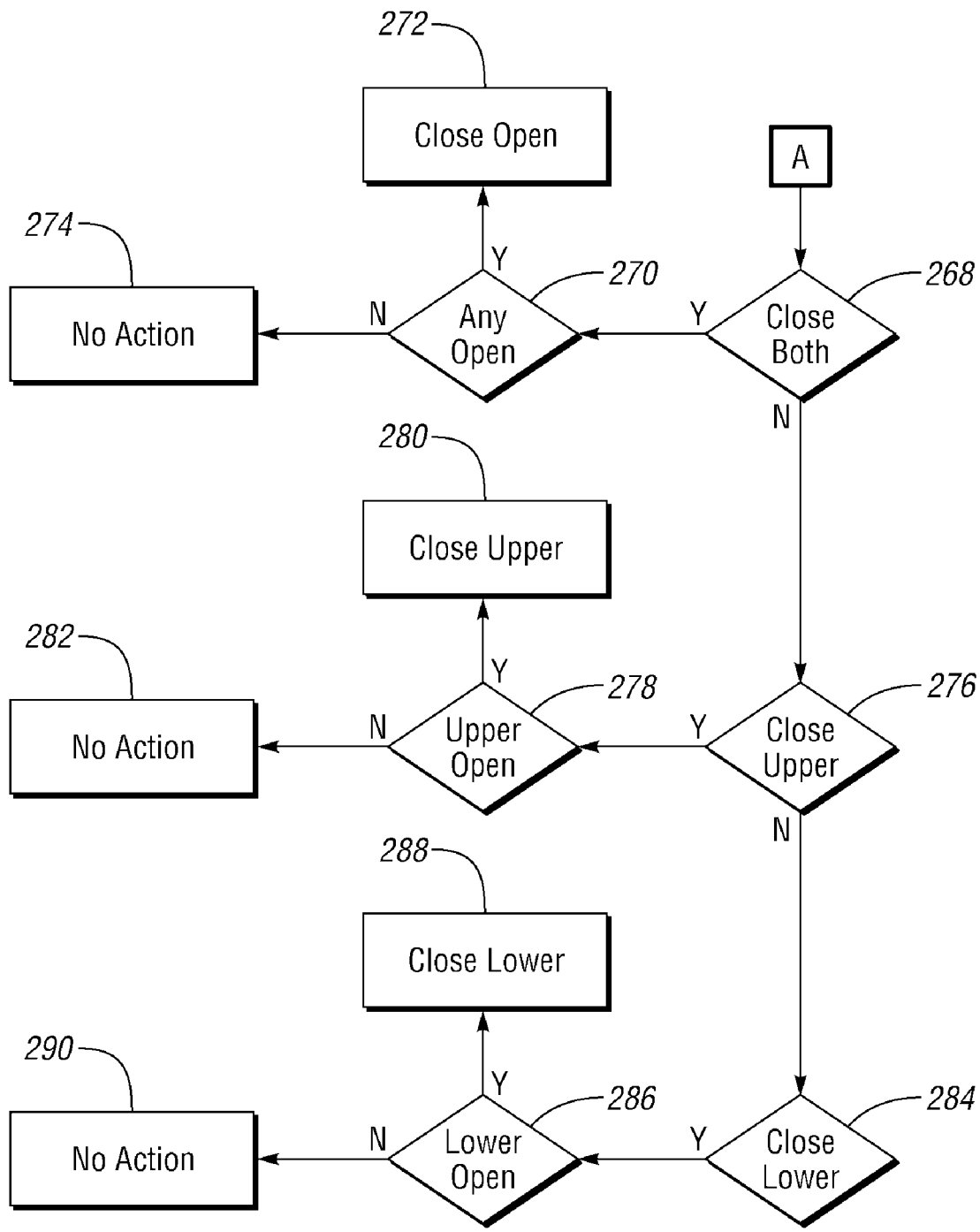

For example, FIG. 7 illustrates a flowchart 220 of a method in which decisions to open or close the tailgate doors 14, 16 are made independently of a position of the tailgate doors 14, 16 at the time the door control command is received whether the tailgate doors 14, 16 were opened manually or electronically. Instead, the method assesses the desired door control sequence depending on whether the command was an open or close command. The method begins in Block 222 upon receipt of a tailgate door command message. Block 224 interrogates the door command to determine whether it is an open door command or a close door command. This decision may be based on information included with the door command message or from other information. For example, the fob 20 or vehicle 12 may include separate open and close buttons (not shown) for each of the tailgate doors 14, 16—like the fob 20 lock and unlock buttons 88, 90. Alternatively, an inquiry into the result of the last door control command can also be used to determine whether the current door control command is an open or closed command, i.e., if the last command result in door 14, 16 opening, then it may be presumed that the next door command would result in door 14, 16 closing and vice versa.

Block 226 interrogates a command of the type intended to open one or more of the doors 14, 16 to determine whether it is an open both command in which both doors 14, 16 are to be opened. If it is an open both command, Block 228 assesses whether any door 14, 16 are currently open such that both doors 14, 16 are automatically opened in Block 230 if no doors are opened and any closed door is opened in Block 232 if at least one door is closed. If the door command was not an open both command, Block 234 interrogates the door command to determine whether it is an open upper command in which only the upper door 14 is to be opened.

If the open upper command is determined, an assessment of whether any door is open is made in Block 236. If no door 14, 16 is open, the upper door 14 is opened in Block 238, else an assessment is made in Block 240 as to whether both doors 14, 16 are open. If both doors are open, the lower door 16 is closed in Block 242, else an assessment is made in Block 244 as to whether the upper door 16 is open. Depending on whether the upper door 14 open, no action is taken in Block 246 or the upper door is opened and the lower door is closed in Block 248.

If the door command was not an open upper command, Block 250 interrogates the door command to determine whether it is an open lower command in which only the lower door 16 is to be opened. If the open lower command is determined, an assessment of whether any door is open is made in Block 252. If no door 14, 16 is open, the lower door 16 is opened in Block 254, else an assessment is made in Block 254 as to whether both doors 14, 16 are open. If both doors are open, the upper door 14 is closed in Block 258, else an assessment is made in Block 260 as to whether the upper door 14 is open. Depending on whether the upper door 14 open, no action is taken in Block 262 or the lower door is opened and the upper door is closed in Block 264.

If the door command was not an open command, and instead, was a close command, Block 268 assess whether the closed command was a close both command in which both of the upper and lower doors 14, 16 are to be closed. If any door is determined to be open in Block 270, the open doors are closed in Block 272, otherwise not actions is taken in Block 274. A similar process is repeated in Blocks 276, 278, 280, and 282, as well as in Blocks 284, 286, 288, and 290, where the upper and lower doors 14, 16 are respectively closed if open at the time the corresponding close door command is received. The close door control sequence is described slightly different from the open door control sequence in that the door close operations are instigated with respect to only the commanded door 14, 16, whereas the open door sequence may include commanding a non-commanded door 14, 16.

In more detail, the open sequence may include closing an open door 14, 16 upon receipt of another open command, such as if an open lower command is received when both doors are open. This would require the additional command of closing the upper door 14. In contrast, a similar sequence for a close command would only require closing the lower door 16—the upper door 14 may remain open. The difference between the open and close command sequences are provided to describe the variability in the door control sequences contemplated by the present invention and is done for exemplary purposes, and unless otherwise noted, without intending to limit the scope and contemplation of the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of articulating a power, split tailgate system of a vehicle, wherein each of a upper tailgate door and a lower tailgate door are electrically movable between an open position and a closed position, a compartment cover dividing a storage area within the vehicle behind the upper and lower tailgate doors, the method comprising:
    displaying a plurality of door control sequences within a human machine interface (HMI) of the vehicle;
    determining user selection of a first door control sequence from the plurality of displayed door control sequences, the first door control sequence corresponding with a chauffer mode in which, when both of the upper and lower tailgate doors are in the closed position:
        i. the upper tailgate door is electrically moved no more than a portion of a distance required to move to the open position, the distance being sufficient for a top of the lower tailgate to clear a bottom of the upper tailgate and for the bottom of the upper tailgate door to remain below the compartment cover; and
        ii. the lower tailgate is electrically moved to the open position after the top of the lower tailgate is clear of the bottom of the upper tailgate;
    executing the first door control sequence upon receipt of the door control message.

2. The method of claim 1 further comprising, upon subsequent user selection of a second door control sequence from the number of door control sequences, executing the second door control sequence in place of the first door control sequence upon subsequent receipt of the door control message.

3. The method of claim 2 further comprising associating the first door control sequence with a first user associated with a first remote control and associating the second door control sequence with a second user associated with a second remote control, configuring each of the first and second remote controls to issue an identifier with the door control message that indicates whether the first or second remote control is transmitting the door control message, and executing the first or second door control sequence depending on whether the identifier associated with the first or second remote control is received with the door control message.

4. The method of claim 1 further comprising the chauffer mode door control sequence including controlling a compartment cover motor to actuate a leading edge of the compartment cover to a position proximate the upper tailgate door prior to the upper tailgate door being moved the distance.

* * * * *